Dec. 9, 1952 W. H. TYLER 2,620,839
CAM ACTUATED FRAME HOLDING CLAMP
Filed Oct. 8, 1946
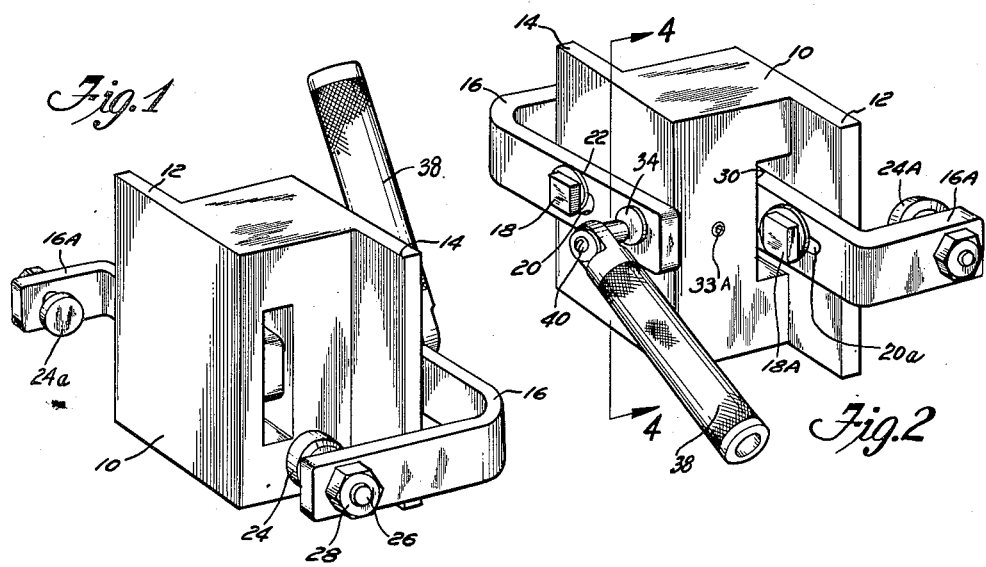
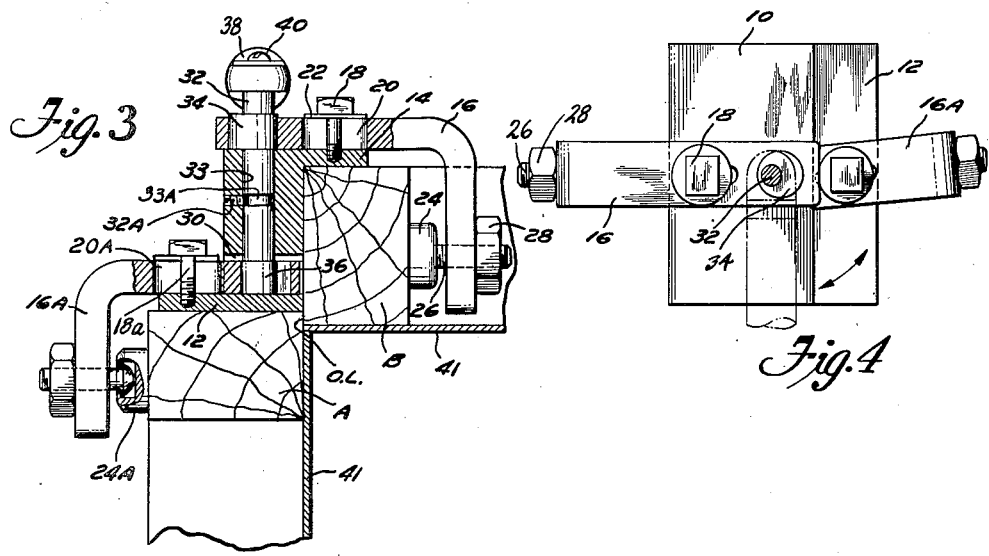
INVENTOR.
WALTER H. TYLER
BY Luther L. Mack
Attorney Patented Dec. 9, 1952

2,620,839

UNITED STATES PATENT OFFICE 2,620,839

CAM ACTUATED FRAME HOLDING CLAMP

Walter H. Tyler, Los Angeles, Calif.

Application October 8, 1946, Serial No. 701,921

7 Claims. (Cl. 144—297)

My invention relates to clamping means for holding structural or framing members releasably together without in any way marring them, and is specifically designed to hold together the meeting edges of temporary structures incorporating framing members, though not necessarily restricted to such use.

As an example of the field of use of the clamp, it will be described as applied in holding together stage sets used in motion picture photography. Such sets are generally painted on canvas mounted on a wooden frame of rectangular material of relatively light construction. The sets are erected generally by nailing the frames together so that by repeated use they become badly worn, necessitating the provision of new frames. The clamp of my invention is designed so that the meeting edges of the frames can be drawn together and securely held without in any way marring the frames.

It is an object of the invention to provide a clamp including a body acting to aid in positioning the work, clamping members being mounted for movement on said body and operated by means effective to bring the clamping members into engagement with a plurality of work pieces and hold them in abutting relation to one another.

It is a further object of the invention to provide a clamp of the kind described, in which the means acting to bring the clamping members into engagement with the work is formed as a shaft operative to rotate eccentrics carried by the clamp body and working in appertures formed in the clamping members, rotation of the shaft by a handle serving to operate the clamping members both into and out of work holding relation.

Further features of the invention will hereinafter appear from the following specification taken in conjunction with the accompanying drawings illustrating an embodiment of the invention at present deemed preferable by me and in which:

Fig. 1 is a perspective view taken from one side of the clamp;

Fig. 2 is a perspective view taken from the opposite side of the clamp shown in Fig. 2;

Fig. 3 is a plan of the clamp in position, with parts shown in section;

Fig. 4 is a side elevation, the view being taken on the line 4—4 of Fig. 2.

In the drawings, the numeral 10 indicates the body of the clamp, which is shown as rectangular in form to lie against the vertical edges of frame members A and B. Preferably, a pair of opposite faces of the block are extended as oppositely directed flanges 12 and 14. A clamping arm 16 is mounted to slide on one side of the body 10 and flange 14 being guided for accurate movement by a threaded stud 18 screwed into flange 14 and passing through an elongated slot 20 in arm 16. Preferably, a wear washer 22 is interposed between the head of the stud 18 and the arm 16.

The clamping arm 16 is bent to bring its free end into a plane substantially parallel to the body of the clamp at right angles to the side on which the arm is mounted.

A swivelling pressure foot 24 is mounted on a threaded stem 26 screwed into a threaded bore in the arm 16, the stem being secured in adjusted position by a nut 28.

A second clamping arm 16a, which may be of identical construction to arm 16 as shown in the drawings, is mounted for sliding movement in a slot 30 formed in the body 10 of the clamp and held by a stud 18a for sliding movement between the flange 12 and the body 10 of the clamp, stud 18a passing through slot 20a in the clamping arm 16a and being threaded into flange 12 in an arrangement identical to that described with reference to the mounting arm 16 on the clamp.

The clamping arms 16 and 16a are simultaneously moved by a primary adjustor 32 to apply pressure to opposite sides of framing element A through pressure feet 24 and 24a, respectively, while framing element B is held between pressure foot 24 of arm 16 and body 10 of the clamp. Adjustor 32 has a shaft seated in a bore 33 of body 10 with spaced eccentrics 34 and 36 thereon which seat in bores of arms 16 and 16a, respectively, so that when the adjustor is rotated the eccentrics will correspondingly and simultaneously move the pressure feet 24 and 24a into or out of clamping engagement with the framing elements. The adjustor 32 is arranged in a bore 33 in the body and may be held in position in the bore 33 by a set screw 32a engaged in a peripheral groove 33a in shaft 32. The eccentrics are preferably arranged with their high points displaced 180° with respect to the axis of the shaft 32. A handle 38 is formed with a square hole fitting tightly on the squared end (not shown) of shaft 32, and held thereon by a threaded stud 40 screwed into a threaded bore in the end of the shaft 32. By rotating handle 38, the eccentrics will force the pressure foot on each of the clamping arms to move inwardly toward one another and exert a strong positive clamping action on the framing members A and B, holding them against each other. It will be noted that the mounting of the clamping arms 16 and 16a on the clamp body will permit them to rock slightly about studs 18 and 18a, respectively, as the eccentrics are rotated, this rocking movement being permitted by the swivel mounting of the pressure foot parts 24 and 24a. Obviously, the eccentrics may be secured to the eccentric shaft in any suitable manner.

The framing members A and B are positioned so that their proximate edges overlap as indicated at OL in Fig. 3 so that a tight corner joint is secured between the framing members and the material 41, such as painted canvas or plywood sheets, mounted thereon.

It is believed evident that the use of my invention will not only greatly facilitate the erection of structures, such as movie sets, requiring to be readily assembled and later dismounted, but also avoids injury to the framing members thereof.

A further use to which the invention may be applied, is to hold together molding forms, such as are used in producing articles of cast concrete and other cast or molten material.

It will be seen that the meeting edges of the work pieces are clamped together, thus covering the clamping device.

While I have described and illustrated a preferred form of the invention, it is to be understood that various changes and modifications may be effected by those skilled in the art, without departing from the scope of the invention as indicated by the attached claims.

I claim:

1. A clamp for releasably holding pieces of work together comprising: a body formed with angularly related surfaces adapted to abut surfaces of separate pieces of work, a pair of clamping arms adjustable toward and away from each other on the body and having portions bent at angles from their planes of adjustment on the body for engagement with other surfaces of the pieces of work whereby when the clamp is tight portions of the pieces of work will be held in abutment, and adjustable pressure elements carried by said bent portions of the clamping arms for direct engagement with the work pieces.

2. A clamp for releasably holding angularly disposed pieces of work together comprising a body formed with right angularly related surfaces adapted to abut surfaces of separate pieces of work, a pair of clamping arms in spaced parallel planes adjustable toward and away from each other on the body and having right angularly bent opposed portions between which the work is adapted to be held, and an adjustor borne by said body and operatively engaging and for simultaneously adjusting the clamping arms on the body for application to the pieces of work.

3. A clamp for releasably holding angularly disposed pieces of work together comprising a body formed with right angularly related surfaces adapted to abut surfaces of separate pieces of work, a pair of clamping arms adjustable toward and away from each other in spaced parallel planes on the body and having right angularly bent portions, for engagement with other surfaces of the pieces of work whereby when the clamp is tight portions of the pieces of work will be held in abutment, a primary adjustor borne by said body and operatively engaged with and for simultaneously adjusting the clamping arms on the body for application to the pieces of work, and pressure elements carried by the bent portions of said clamping arms for direct and final application of pressure to the work following preliminary adjustment thereof by the primary adjustor, and means for operating said adjustor to move said arms to preliminary clamping positions.

4. A clamp for releasably holding pieces of work together comprising: a body formed with a plurality of angularly related plane surfaces and having flanges extended in opposite directions from two opposite parallel surfaces thereof and a pair of clamping arms adjustable toward and away from each other in spaced parallel planes on corresponding surfaces of said flanges and having right angularly bent portions extended therefrom and adjustable relative to surfaces of said pieces of work which are at right angles to said flanges.

5. A clamp for releasably holding pieces of work together comprising: a body having flanges extended in opposite directions from opposite sides thereof and a pair of clamping arms adjustable toward and away from each other in spaced parallel planes on corresponding surfaces of said flanges relative to said pieces of work and having right angularly bent portions extended therefrom and adjustable relative to surfaces of said pieces of work and pressure elements adjustably borne by said right angularly bent portions of the clamping arms for engagement with surfaces of said pieces of work.

6. A clamp as characterized in claim 4 including a primary adjustor on each of said arms for bodily adjusting said arms on said flanges to approximate clamping positions, and a secondary adjustor on each right angularly bent portion of said arms for adjusting the arms to final clamping positions.

7. A clamp comprising: a body having a plurality of angularly related surfaces and flanges oppositely extended from opposite parallel surfaces thereof and arranged to seat in the right angular space formed by the intersection of two right angular surfaces of separate pieces of work, clamping arms on opposite sides of said body having opposing bent portions adapted to be disposed opposite parallel surfaces of said pieces of work, an eccentric primary adjustor axially rotatable for adjusting said arms to a preliminary extent toward and away from each other, means for locking said arms in adjusted positions on said body, and secondary adjustors borne by the bent portions of said arms and having pressure elements finally engaging surfaces of said pieces of work for holding the work in clamped positions.

WALTER H. TYLER.

REFERENCES CITED

The following references are of record in the file of this patent:

UNITED STATES PATENTS

| Number | Name | Date |
| --- | --- | --- |
| 1,769,511 | Heston et al. | July 1, 1930 |
| 2,092,372 | Goeller | Sept. 7, 1937 |
| 2,156,195 | Robillard | Apr. 25, 1939 |
| 2,355,603 | Zern | Aug. 8, 1944 |
| 2,427,081 | Zern | Sept. 9, 1947 |